June 9, 1936. C. W. ADAIR 2,043,788

ROTARY STEAM FRICTION MOTOR

Filed April 7, 1934

Inventor
Clark W. Adair

Patented June 9, 1936

2,043,788

UNITED STATES PATENT OFFICE 2,043,788

ROTARY STEAM FRICTION MOTOR

Clark W. Adair, Chicago, Ill.

Application April 7, 1934, Serial No. 719,513

1 Claim. (Cl. 253—50)

The purpose of this invention is to transfer steam motor force to a driving shaft. It consists of a driving shaft and a three section cylinder closed at both ends. The two end sections are alike and are coupled together by the middle section, which consists of a pair of circular frames supporting a plurality of louvers. All parts are joined together as one piece and rotate around a common axis.

Figure 1:
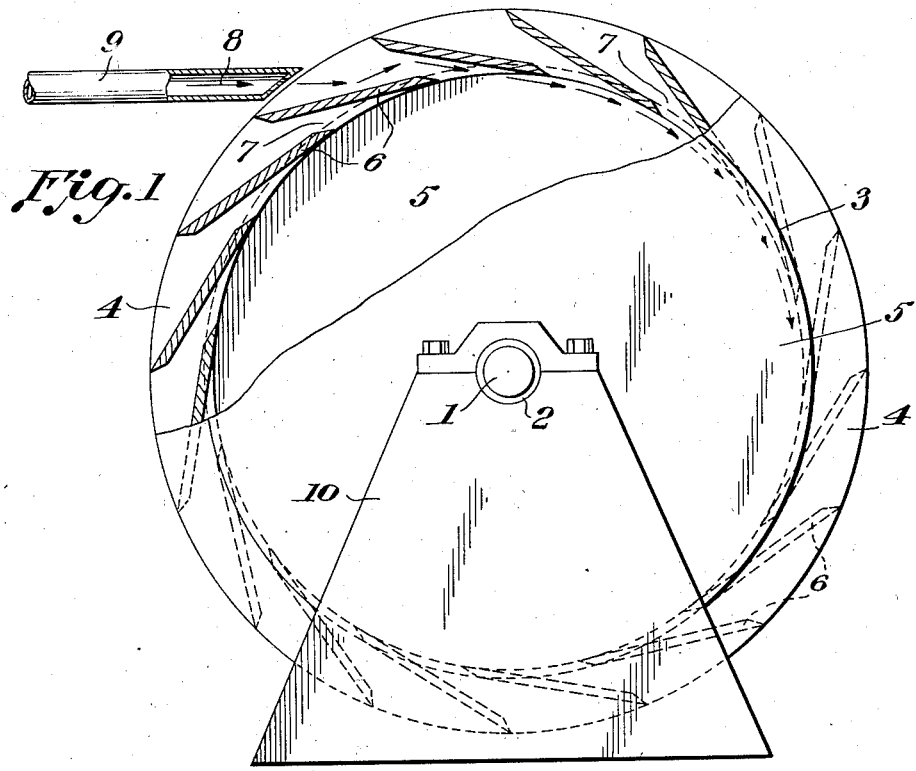

In the accompanying drawing which forms part of this specification Fig. 1 is an end view of the rotary steam friction motor with part of one end section and a part of one of the circular frames of the middle section cut away. It shows the motor mounted on bearings, the end of the driving shaft and the cylinder, the circular frames of the middle section projecting and extending around the end sections and supporting a plurality of louvers, the beveled edges of the louvers, openings between the louvers; and a side view of a stream of steam starting to rotate within the cylinder which steam is being injected into the cylinder through the openings between the louvers from a steam pipe connected to a steam supply not shown.

Figure 2:
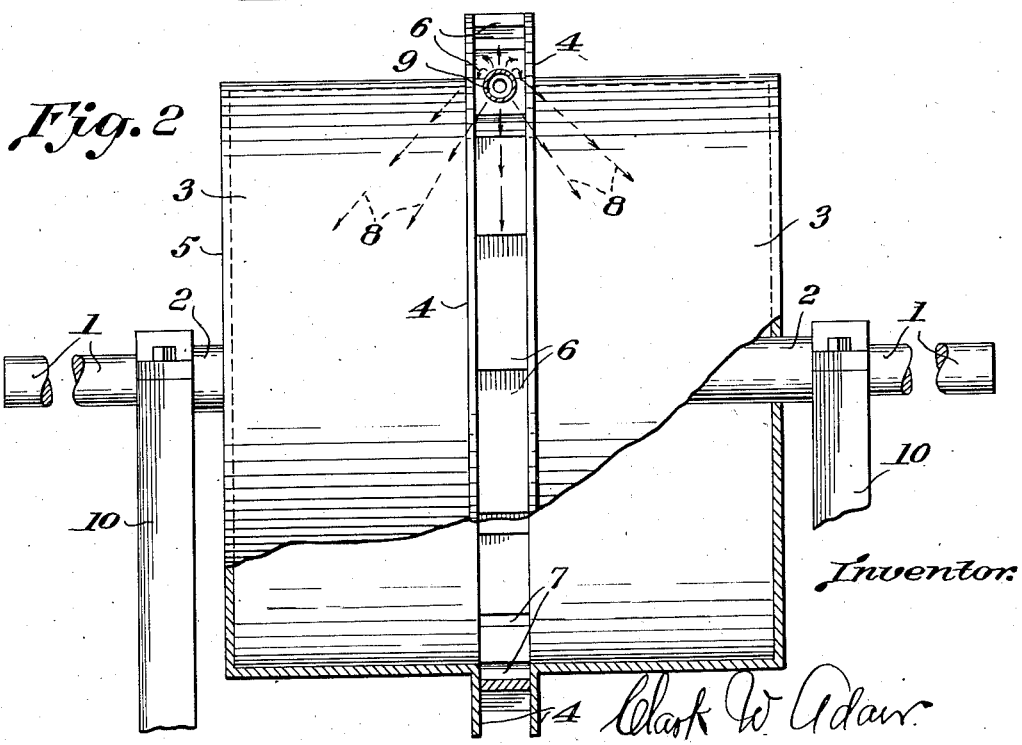

Fig. 2 is a side view of the rotary steam friction motor. It shows the driving shaft with two shoulders, the two end sections of the cylinder coupled together by the circular louvered frame middle section, the outside edges of frames and louvers, the openings between the louvers; and an end view of a stream of steam starting to rotate and spread out fan-like, which steam is injected into the cylinder through the openings between the louvers from a steam pipe.

In the accompanying drawing the driving shaft is numbered 1, the driving shaft shoulders 2, the two end sections of the cylinder 3, the closed cylinder ends 5, the circular frames 4, the louvers 6, the openings between the louvers 7, the steam 8, the steam pipe 9, and the mountings 10.

The device comprises a driving shaft 1, with two shoulders 2 extending around the driving shaft 1 to engage the bearings in the mountings 10 and prevent end movement and vibration of the motor. A driving shaft 1 extends through the center of the three section cylinder 5—3—4—6—4—3—5 parallel with the inner surface of the cylinder port 3—4—6—4—3 and projects from the center of the closed ends 5 of the cylinder. The three section cylinder is provided with closed ends 5, the end sections 5—3 3—5 being alike and coupled together by the middle section 4—6—4 comprised of a pair of circular frames 4 supporting a plurality of louvers 6 with beveled edges equally spaced and placed in the circular frames 4 so that the louvers 6 overlap one another when the point of view is the center of the cylinder and make a plurality of tapered openings 7 extending around the cylinder. The hollow cylinder 5—3—4—6—4—3—5 with the driving shaft 1 in the center and all parts joined together rotate as one piece around a common axis.

Operation

This device is rotated by injecting one or more than one stream of steam 8 under pressure between the louvers 6 into the cylinder 5—3—4—6—4—3—5 in such a manner that the beveled edges of the louvers 6 offer but little resistance to the steam stream 8 passing into the cylinder 5—3—4—6—4—3—5. The steam stream 8 first strikes the louvers 6 at a variable angle, and starts to spread out fan like and rotate within the cylinder 5—3—4—6—4—3—5.

As the motor rotates the bevel edged louvers 6 pass through the steam stream 8 and the flow of the steam 8 is not diverted from its intended course or interrupted as it changes from one opening 7 to another.

The momentum force of the steam which rotates within the cylinder faster than the cylinder rotates causes the steam to pass over part of the openings 7 in the cylinder and help to prevent its own escape until it has spread out fan-like and has transferred part of its motor force to the motor.

The steam injected into the cylinder having a momentum force assumes a centrifugal force as soon as it starts to rotate within the cylinder. The centrifugal force causes the steam to continually rub against the inner surface of the cylinder as the steam rotates within the cylinder. The steam 8 escapes from the cylinder. When the speed of the rotating steam has slowed down, then the centrifugal force of the steam crowds the steam back into the tapered louvered openings and the louvers serve as blades in a centrifugal pump and expel the most steam 8 from the large end of the tapered louvered openings 7 near the point of injection.

The friction of the steam 8 striking the louvers 6, rotating and rubbing against the inner surface of the cylinder 5—3—4—6—4—3—5 and passing out of the cylinder through the openings 7 between the louvers 6 force the motor to rotate.

I claim:

An invention in a fluid motor, a rotor comprising an annular member, louvers on the member forming a plurality of tapered intake and exhaust openings, and adapted to receive and direct a motive fluid into the rotor for rotating the rotor, a pair of cylinders each having smooth inner surface with outer closed end, attached one to each side of the annular member to receive motive fluid injected into rotor between louvers whereby any remaining motive force in the fluid exhausted from the tapered louvered openings is transferred by friction to the smooth inner surface of the cylinders, said fluid being then exhausted through the same openings between the louvers that it was injected into the rotor, a shaft supporting the rotor, mountings supporting the shaft, and a means for directing the motive fluid into the louvered openings in the rotor.

CLARK W. ADAIR.